Patented Aug. 2, 1932

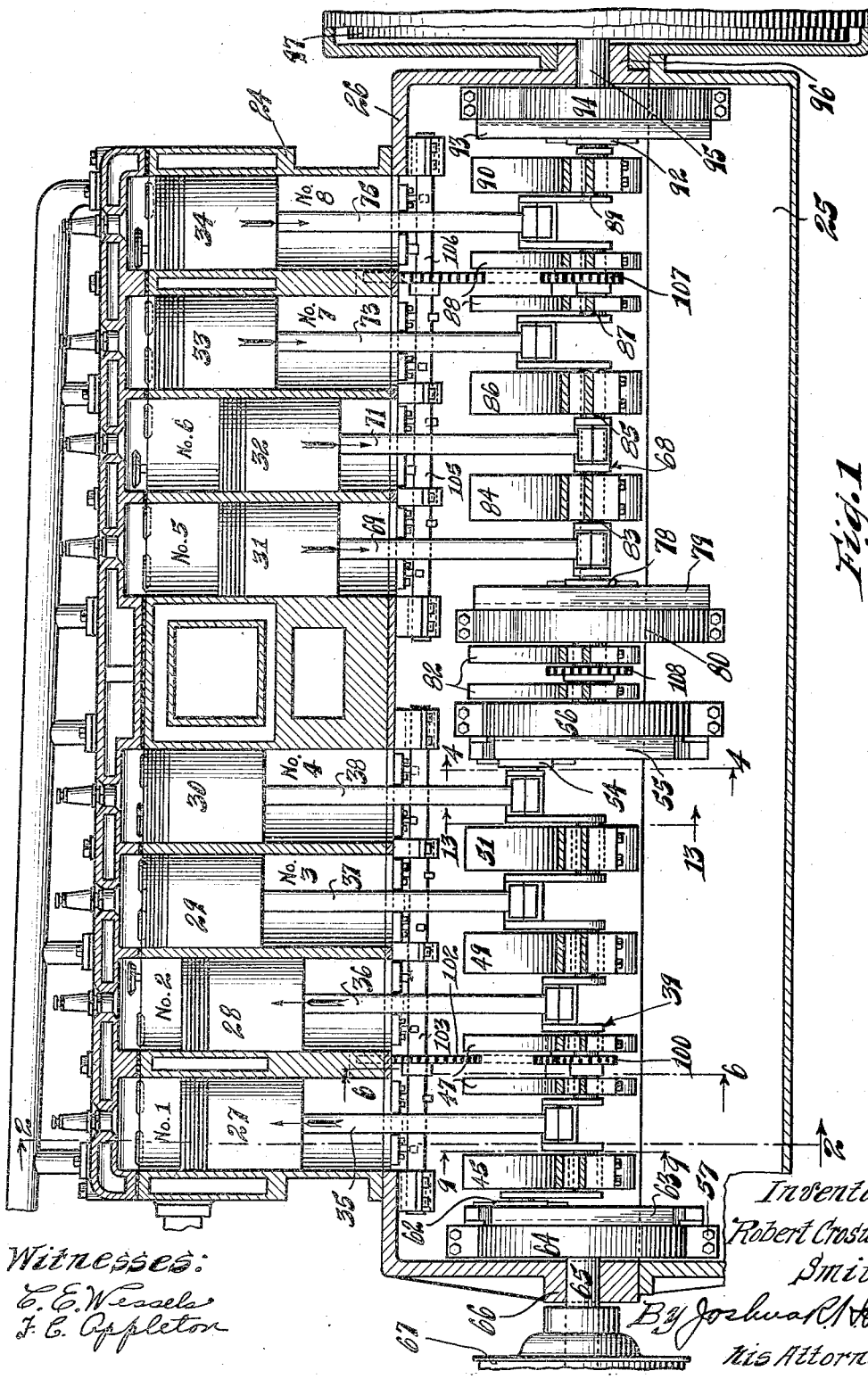

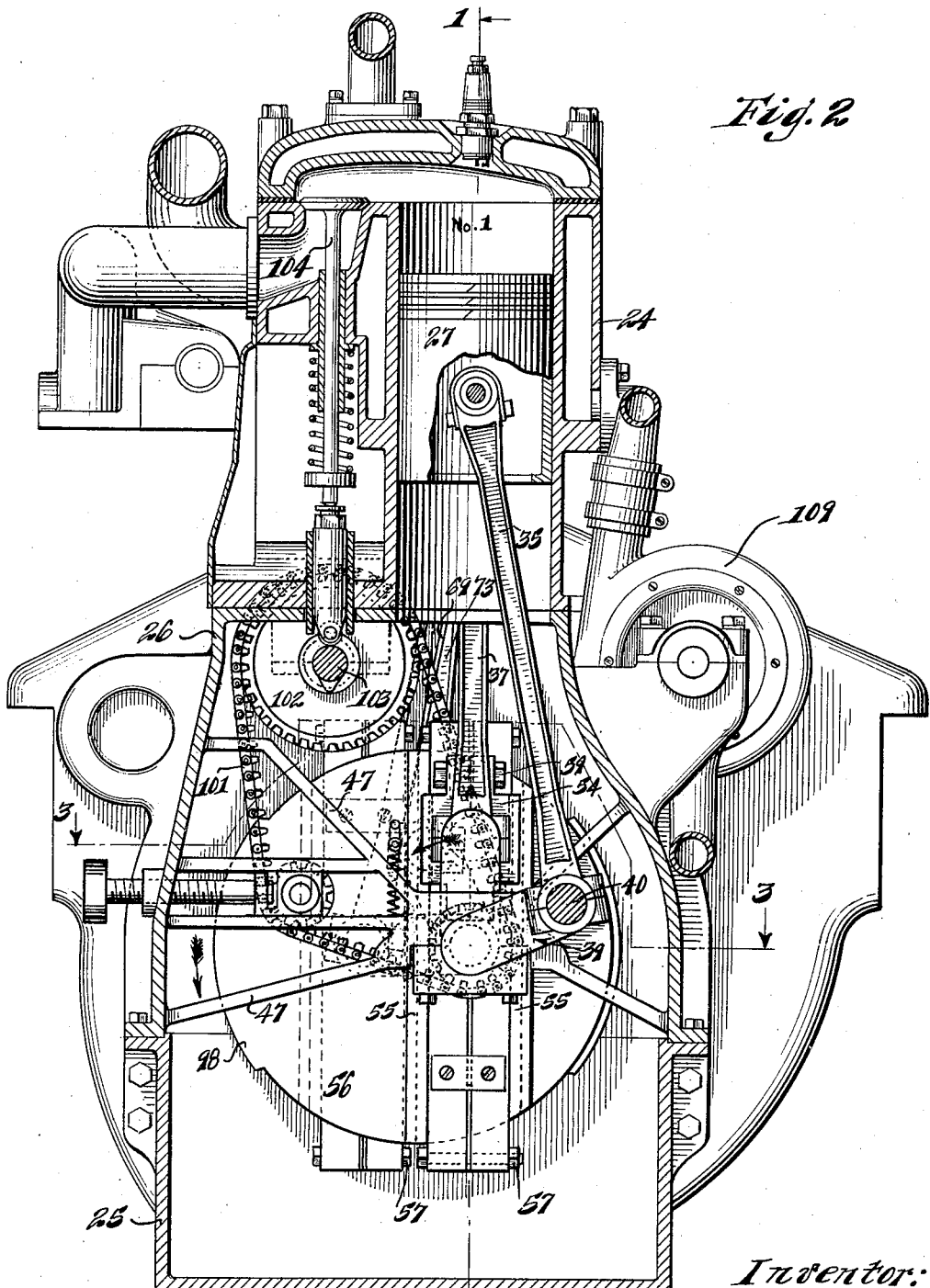

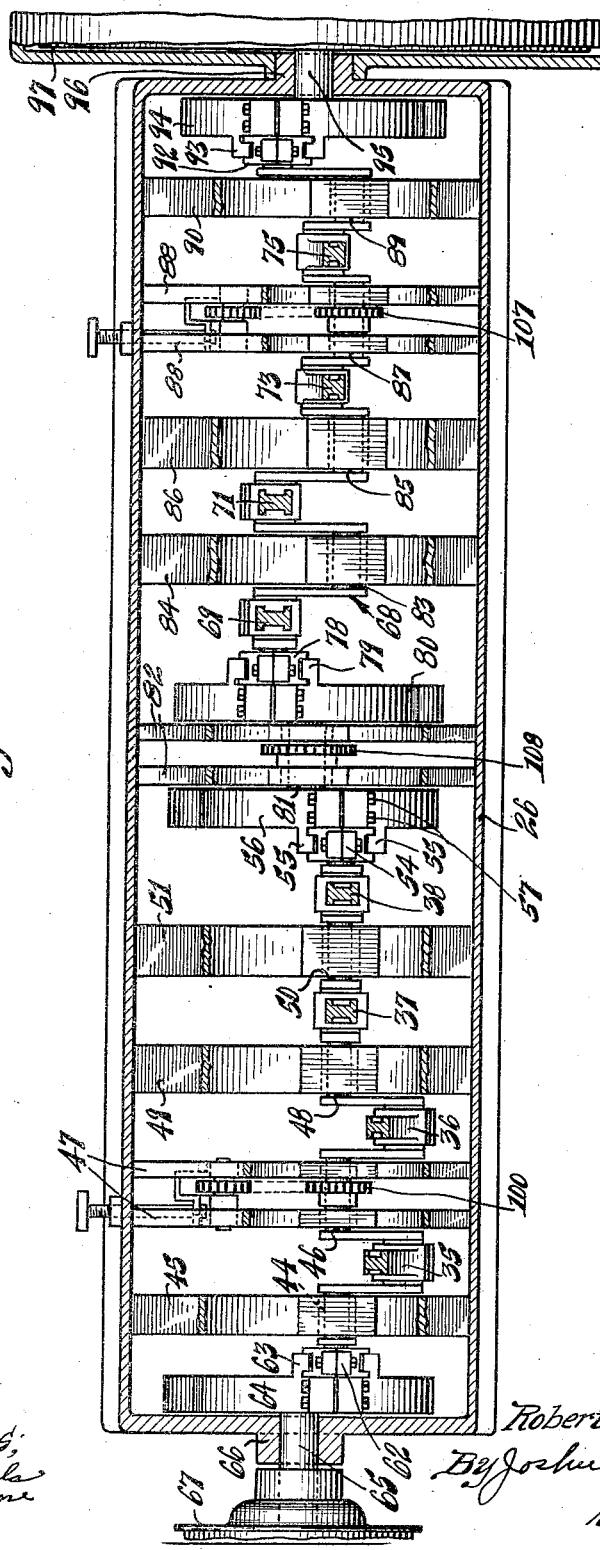

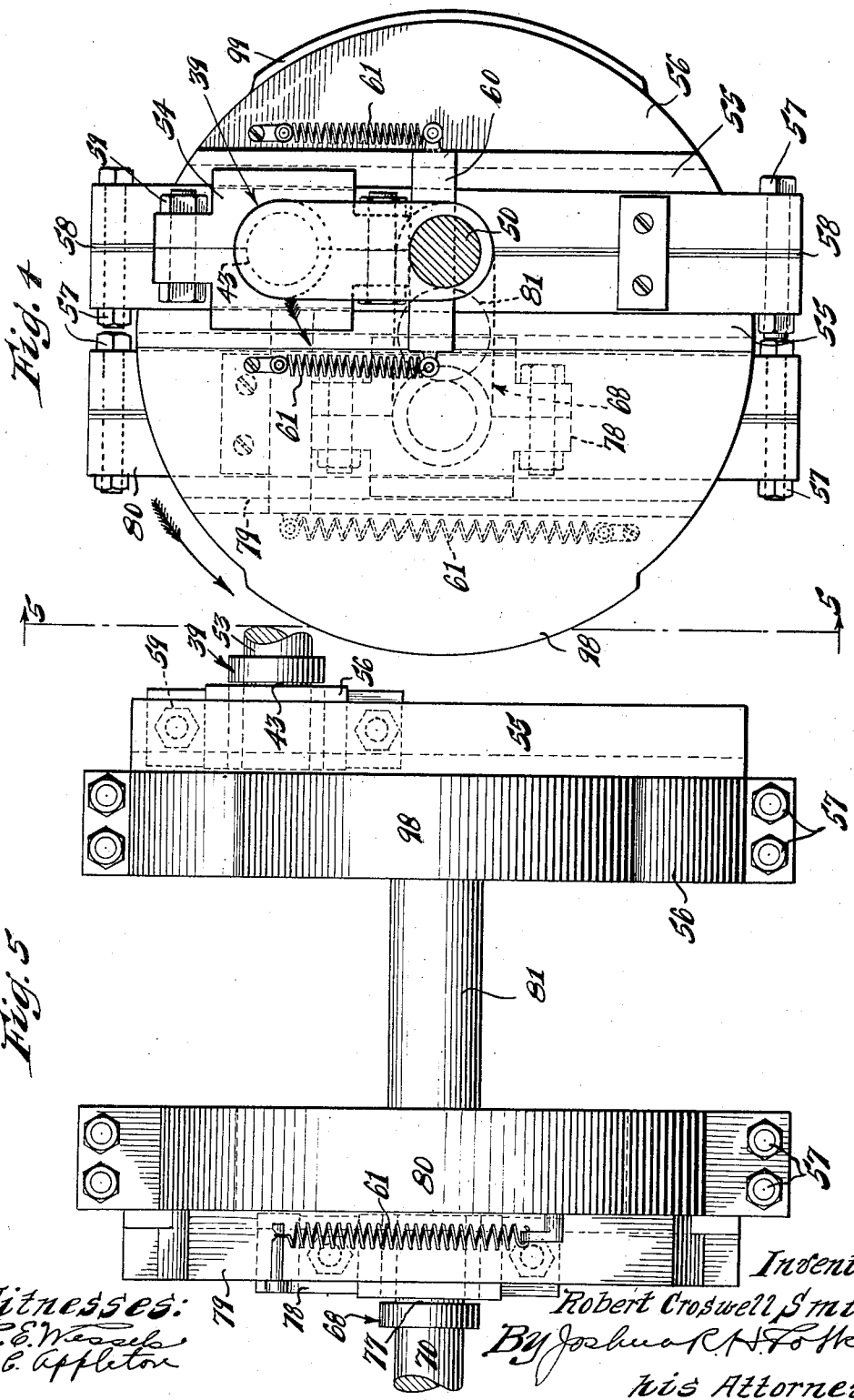

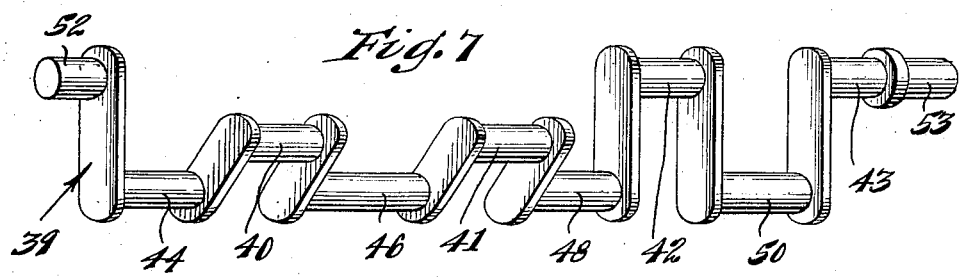
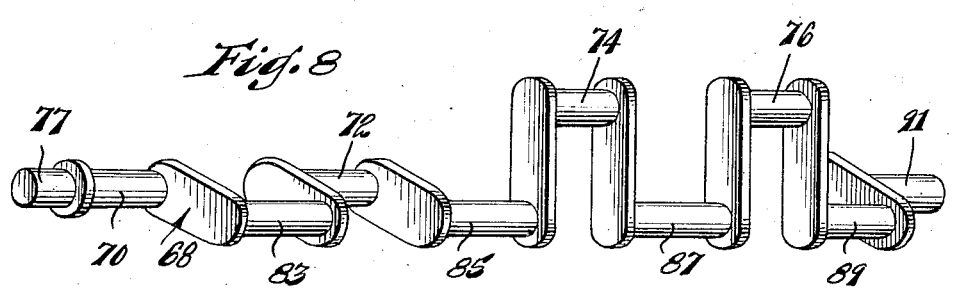
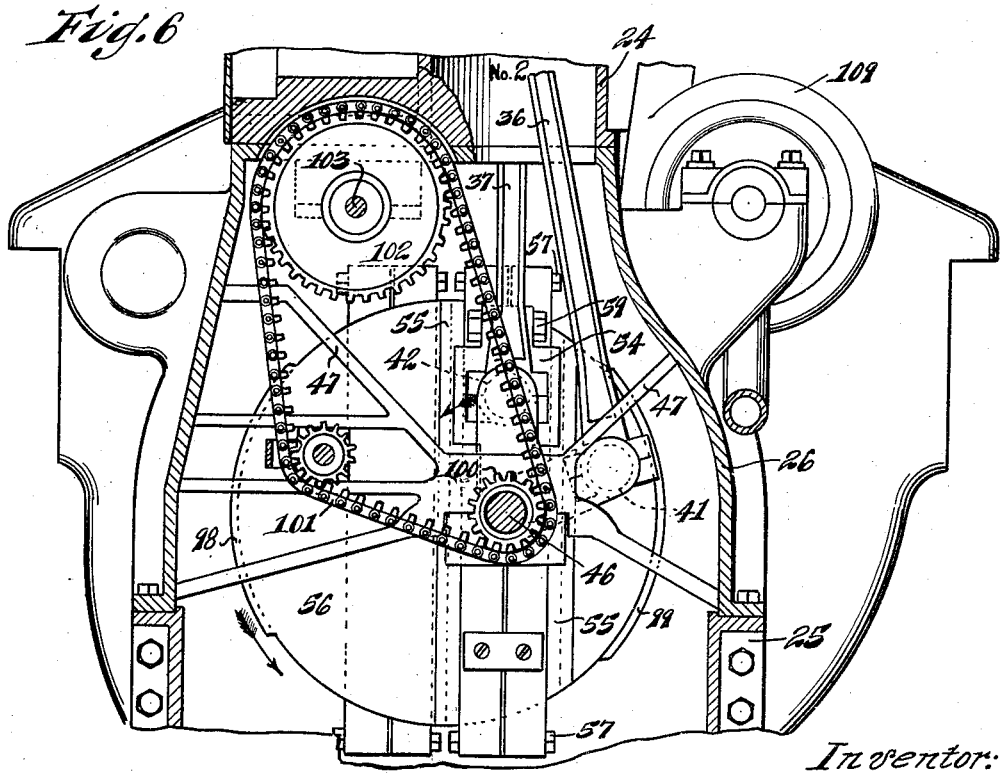

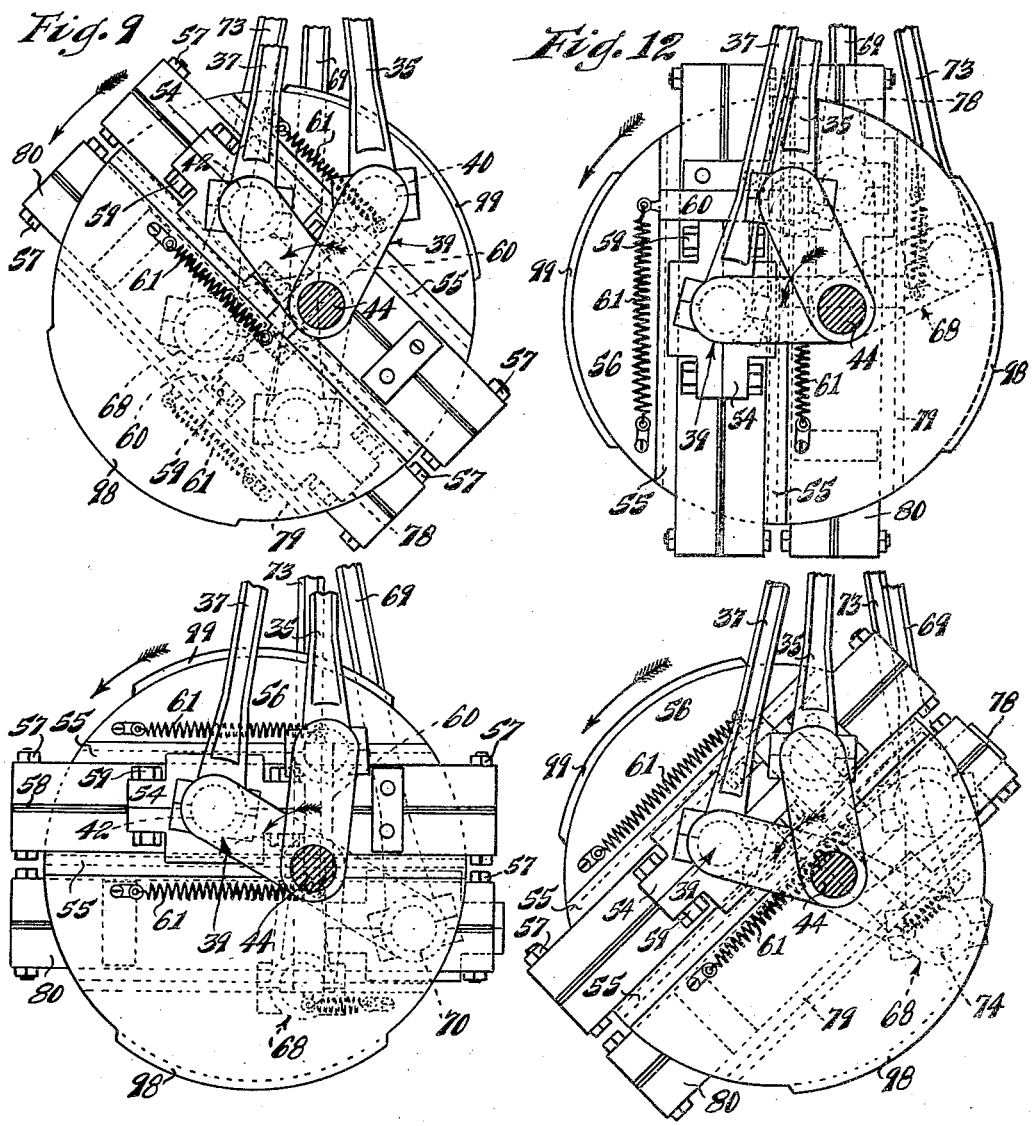

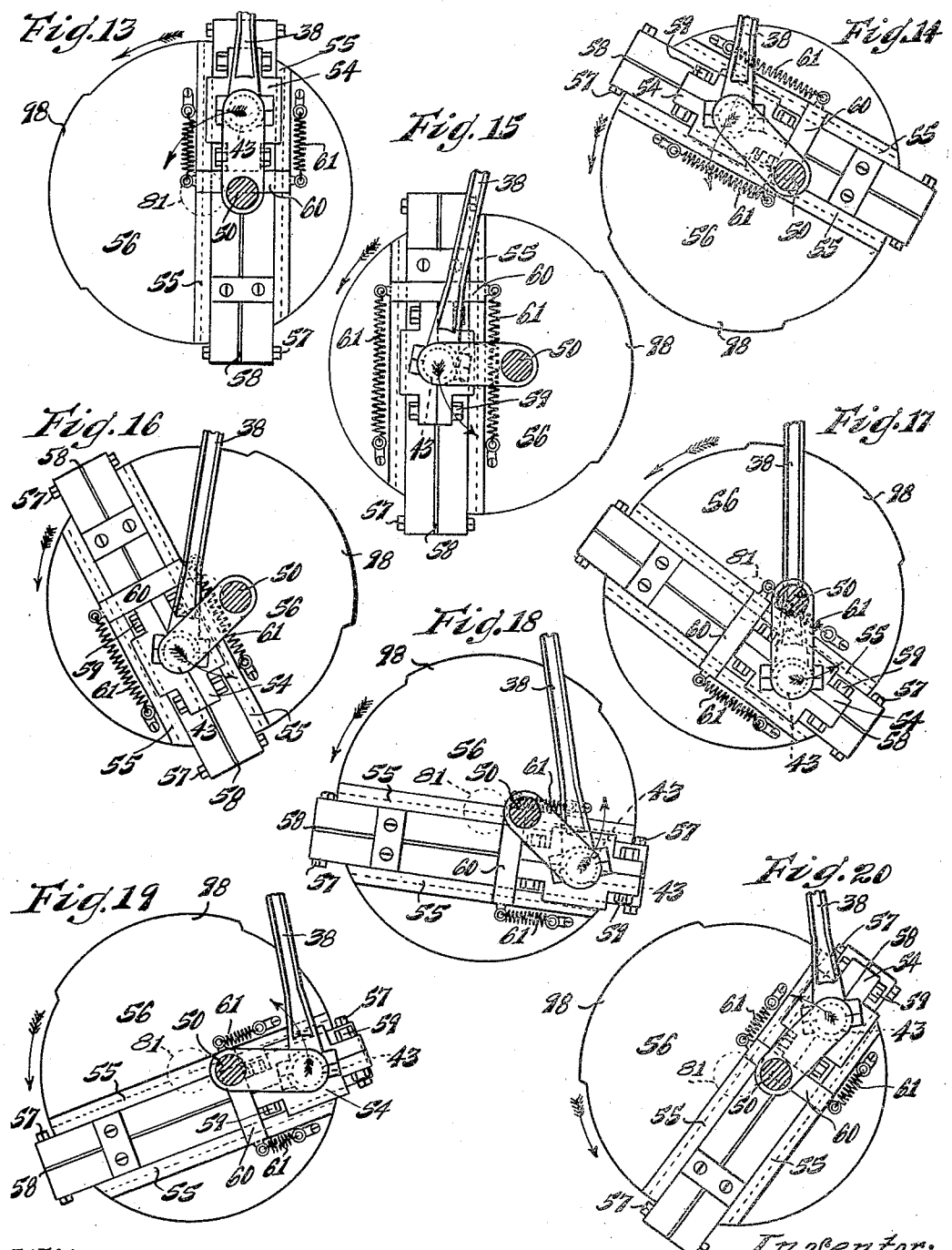

1,869,587

UNITED STATES PATENT OFFICE

ROBERT CROSWELL SMITH, OF CHICAGO, ILLINOIS

MOTOR PISTON CONTROL APPARATUS

Application filed April 2, 1931. Serial No. 527,184.

This invention relates to a motor piston control apparatus constructed and designed to obtain the fullest advantage and benefit of the power stroke of a piston in a motor or engine driven by reciprocating pistons operable in cylinders and connected to a crank shaft. The preferred embodiment of the invention illustrated is in operative association with a gasoline internal combustion engine of the straight eight type having eight cylinders in line, inasmuch as this construction permits of disclosure of the divided or multiple crank shaft feature of the invention. It will be understood, however, that the invention is not necessarily confined to an internal combustion engine, or to an engine employing a multiplicity of pistons. The invention may be advantageously employed in other types of engines or in other types of machines wherein it is desired to provide a differential rotational speed between the shaft connected to the piston or pistons and the shaft which provides or receives power. In a power creating motor or engine, a more particular object resides in providing drive mechanism whereby a differential rotational speed is created between a crank shaft which is directly connected to the respective pistons and the power shaft which applies power externally of the engine. A further object resides in utilizing this differential rotational speed to cause the power shaft to rotate a greater circumferential distance than the crank shaft during the impulse stroke of the piston. An additional object is to provide overlapping of impulses which gives greater smoothness and flexibility of operation. A further object is to increase the relative rotational speed of the crank shaft during the scavenger and compression strokes. An additional object is to provide a divided crank shaft or a pair of crank shafts axially in alignment but both axially offset from the power shaft whereby the impulses are more evenly distributed, and smoothness of operation and flexibility obtained.

Other objects will appear hereinafter.

The invention consists in the combinations and arrangements of parts hereinafter described and claimed.

The invention will be best understood by reference to the accompanying drawings, forming a part of this specification, and in which:

Fig. 1 is a vertical longitudinal sectional view of an embodiment of the invention in an eight cylinder internal combustion engine, taken substantially on line 1—1 of Fig. 2;

Fig. 2 is an enlarged transverse sectional view, taken substantially on line 2—2 of Fig. 1;

Fig. 3 is a horizontal sectional view, taken substantially on line 3—3 of Fig. 2;

Fig. 4 is an enlarged sectional view of one of the disc members and associated parts, taken substantially on the line 4—4 of Fig. 1;

Fig. 5 is a side elevational view taken from the left of Fig. 4, or substantially on the line 5—5, showing the two central disc members;

Fig. 6 is an enlarged sectional view, taken substantially on the line 6—6 of Fig. 1;

Fig. 7 is a perspective view of the forward crank shaft or the one shown on the left in Fig. 1;

Fig. 8 is a perspective view of the rear crank shaft, or the one shown to the right in Fig. 1;

Fig. 9 is a vertical sectional view taken substantially on the line 9—9 of Fig. 1, but with the power shaft and the disc members secured thereto advanced 45 degrees from the position shown in Fig. 4;

Fig. 10 is a view similar to Fig. 9, with the power shaft and discs advanced 45 degrees beyond that shown in Fig. 9;

Fig. 11 is a similar view, with the power shaft and discs advanced an additional 45 degrees;

Fig. 12 is a similar view, with the same parts advanced an additional 45 degrees beyond the position shown in Fig. 11;

Fig. 13 is a diagrammatic view, taken substantially on the line 13—13 of Fig. 1;

Fig. 14 is a view similar to Fig. 13, with the crank shaft advanced 45 degrees;

Fig. 15 is a view showing the crank shaft advanced 45 degrees beyond Fig. 14;

Fig. 16 shows an additional 45 degree advance of the crank shaft;

Fig. 17 shows an additional 45 degree advance, or with the crank shaft on No. 4 cylinder at lower dead center;

Fig. 18 shows a 45 degree advance beyond Fig. 17;

Fig. 19 shows a 45 degree advance beyond Fig. 18; and

Fig. 20 shows a 45 degree advance beyond Fig. 19.

As illustrated in the drawings, the preferred embodiment of the invention is shown embodied in an eight cylinder engine having a cylinder block 24, lower crank case 25 and upper crank case 26. To facilitate description, the respective cylinders are numbered from 1 to 8, reading from the forward end of the engine. Thus, piston No. 27 reciprocates in cylinder No. 1, piston 28 in cylinder No. 2, piston 29 in cylinder No. 3, piston 30 in cylinder No. 4, piston 31 in cylinder No. 5, piston 32 in cylinder No. 6, piston 33 in cylinder No. 7, and piston 34 in cylinder No. 8. The respective pistons are not directly connected to the power shaft, but pistons 27, 28, 29 and 30 are connected by connecting rods 35, 36, 37, and 38, respectively, to the forward crank shaft 39. Thus, connecting rod 35 is connected to connecting rod bearing 40, rod 36 to connecting rod bearing 41, rod 37 to connecting rod bearing 42, and rod 38 to connecting rod bearing 43. The crank shaft 39 is journaled intermediate its ends in stationary bearings preferably extending inwardly from the upper crank case 26. In the preferred embodiment illustrated, portion 44 of crank shaft 39 is journaled in bearing 45, portion 46 is journaled in separated bearings 47, portion 48 is journaled in bearing 49, and portion 50 is journaled in bearing 51. By this construction and arrangement the crank shaft 39 rotates on the portions 44, 46, 48 and 50 as an axis, with crank arms for the respective connecting rods and having a forward extremity 52 and a rear extremity 53 which follow the circular path described by the connecting rod bearings.

The rear extremity 53 of crank shaft 39 is journaled in a block member 54, as shown in detail in Fig. 4, and block 54 is in turn slidably mounted in a guide 55 mounted on disc member 56. As shown in Fig. 4, the guideway extends through a chord of the disc, or slightly off center, and the disc is formed of two parts separated on a line extending centrally through the guide member 55. These parts are secured together by draw bolts 57 and separated by shim pieces 58 for the purpose of adjustment when the block or guide becomes worn. Similarly, the block member 54 is preferably formed of two pieces as shown, secured by draw bolts 59, and these parts may similarly be separated by shims which may be removed as occasion requires to take up for wear on the crank shaft end 53. A cross bar 60 is maintained in contact with block 54 by means of tension springs 61 which are secured at one end to the disc member 56 and at the opposite ends to the cross bar 60.

In the present embodiment of the invention there are four disc members which are adapted to rotate in unison, and during a part of the rotation the springs 61 are extended, as shown in Fig. 5. The function of these springs is to exert a pulling strain upon the block 54 to carry the crank shaft beyond a dead center point, or, in other words, to prevent the crank shaft from coming to rest at a dead center point when the engine is stopped. The forward extremity 52 of crank shaft 39 is journaled in block 62 slidably mounted in guide 63 mounted upon disc member 64. Disc 64 is affixed to shaft 65 which is journaled in the forward bearing 66, and thus it will be seen that shaft 65 constitutes a power shaft extending externally of the engine, upon which may be mounted fan pulley 67. Disc member 64 and the associated guide 63 and block 62 are identical with the disc member 56, block 54 and guide 55, as well as the associated parts shown in Fig. 4, except that the parts are reversed by reason of the fact that block 62 serves as a bearing for the opposite end of the crank shaft 39. The rear crank shaft 68 as shown in Fig. 8 is similar in construction with forward crank shaft 39 except in reverse position. Referring to Figs. 1 and 8, piston 31 of cylinder No. 5 is connected by connecting rod 69 with connecting rod bearing 70, piston 32 is connected by connecting rod 71 with connecting rod bearing 72, piston 33 is connected by connecting rod 73 with connecting rod bearing 74, and piston 34 of No. 8 cylinder is connected by connecting rod 75 with connecting rod bearing 76. The forward extremity 77 of the rear crank shaft 68 is journaled in block 78 slidably mounted in guide 79 of the center rear disc member 80. Disc member 80 and the associated guide and slidable block are identical in construction and operation with the forward center disc member 56 and the associated guide and slidable block, except in reverse position, as shown in Fig. 4. These two disc assemblies are joined by shaft 81 journaled in stationary divided bearing 82. The rear crank shaft 68 is journaled in stationary bearings corresponding to the journaling of the forward crank shaft and on the same longitudinal axis as the forward crank shaft. Portion 83 is journaled in stationary bearing 84, portion 85 is journaled in stationary bearing 86, portion 87 is journaled in divided bearing 88, and portion 89 is journaled in bearing 90. The rearmost extremity 91 of the rear crank shaft 68, which is in alignment with the forward extremity 77, is journaled in block 92 slidably mounted in guide 93 of the rear disc member 94. The disc assembly represented by the disc member 94 and the associated parts including the guide 93 and the block 92, are keyed upon power shaft 95 journaled in bearing 96, and extending exteriorly of the engine for the transmission or reception of power. In the present embodiment of the invention shaft 95 carries flywheel 97 in accordance with usual internal combustion motor construction.

By the construction and arrangement shown and described, the respective disc members rotate on the same longitudinal axis, and the forward and rear crank shafts likewise rotate upon the same longitudinal axis, but the crank shaft axis is offset laterally from the disc axis, as shown by reference to Fig. 4 wherein the center disc shaft 81 is shown in dotted lines. By reference to Figs. 9 to 12, inclusive, it will be noted that by following the rotation of the respective parts in a counterclockwise direction, the connecting rod bearings for Nos. 3 and 4 cylinders are advanced approximately 65 degrees over the connecting rod bearings for cylinders Nos. 1 and 2. This angular spacing has been determined by the relative movement of the disc members through a 90 degree rotation of the forward crank shaft. On the power stroke of either piston 29 or 30 of cylinder No. 3 or 4 when the crank shaft has traveled approximately 65 degrees the disc members, and consequently the power shafts, travel approximately 90 degrees, and thus either piston 27 or 28 of cylinders Nos. 1 and 2, according to firing order, are at top dead center for the next power stroke when the disc members have traveled 90 degrees, or from the position shown in Fig. 4 to the position shown in Fig. 10. As shown in dotted lines in Fig. 10, in this position the rear crank shaft arms are diametrically opposite the forward crank shaft arms, and the mounting is such that an impulse is produced upon every 90 degree rotation of the power stroke and disc members. The relative positions of the various parts and the differential rotation between the crank shaft and disc members may be conveniently followed by reference to counterweights mounted upon the disc members on the opposite side of the center from the guides. The front center disc 56 carries a counterweight portion 98, as shown in Fig. 4, the rear center disc 80 carries counterweight 99, and the forward disc 64 and rear disc 94 carry corresponding counterweighted portions in the same relative positions.

The diagrammatic Figures 13 to 20, inclusive, show progressively the successive positions of the disc member 56 and the guide 55 and block 54 mounted thereon, with relation to connecting rod 38 of piston 30 reciprocating in cylinder No. 4. These views are sections taken through portion 50 of the forward crank shaft which is journaled in stationary bearing 51 to show the concentric or offset relationship between the crank shaft axis and the disc axis, and also the views show relative positions of one cycle of the crank shaft taken at stages of 45 degrees. By reference to Fig. 13, the piston is at top dead center, exactly as shown in Fig. 4. By reference to Fig. 15 it will be noted that when the crank shaft has traveled 90 degrees, the disc member 56 is advanced 180 degrees. When the crank shaft has traveled through the full 180 degrees of the power stroke, the disc member 56 will have traveled from the position shown in Fig. 13 to the position shown in Fig. 17, or approximately 235 degrees. During this period of operation, the crank shaft travels at a relatively slower speed than the disc member and consequently the power shaft, the greatest differential being through the first 90 degree travel of the crank shaft in the first half of the power stroke. Thus, because of this differential in rotation, and the fact that an impulse is applied at every 90 degree rotation of the disc members, there will result an overlapping of impulses. In normal operation, the disc members and the power shaft rotate at a uniform speed, but it will be understood that because of the differential, the crank shaft rotation is not uniform inasmuch as the power stroke of the piston is utilized to drive the power shaft a greater distance than the rotational travel of the crank shaft. During the first 90 degree travel of the up stroke of the piston from the position shown in Fig. 17 to the position shown in Fig. 19, the disc 56 travels approximately 60 degrees, and when the crank shaft travels the full distance of an up stroke from the position shown in Fig. 17 to the position shown in Fig. 13, the disc member travels approximately 125 degrees. Consequently during the up stroke of the piston the crank shaft rotates at a relatively greater speed than the disc member, resulting in an accelerated movement of the crank shaft, or relatively greater movement, on the scavenger and compression strokes.

The ignition system has not been shown in detail inasmuch as standard equipment for this purpose may be employed and is not involved in the present invention. However, inasmuch as a divided crank shaft is utilized in the present invention, with a differential rotational speed, a divided cam shaft is necessary. Mounted upon the forward crank shaft on the portion 46 between the divided stationary bearing 47 is a gear 100 which drives silent chain 101, as shown in Fig. 6, which in turn drives gear 102 keyed upon cam shaft 103 which actuates the valve 104, as shown in Fig. 2. Cams are appropriately positioned on the cam shaft 103 for the operation of the remaining valves. The rear cam shaft 105 as shown in Fig. 1 carries gear 106 which is similarly driven by gear 107 mounted upon the rear crank shaft. The disc shaft 81 journaled in divided bearing 82 may carry gear 108 for operating water pump 109, and the distributors for the ignition system may be driven by the respective cam shafts or by a direct connection with the crank shafts. By forming the disc members of two segments which may be taken up by removal of shims as wear requires, convenience of adjustment is afforded, and similarly the sliding block members are halved for the same purpose to permit of maintenance of a tight bearing on the crank shaft ends. The tension springs 61 and the cross bars 60 are not essential on the type of engine disclosed having a relatively large number of cylinders, but this mechanism is advisable when using 90 degree discs to throw the bearing holder or slidable block off center when the engine is being cranked by hand or starting motor. The present invention serves to increase and improve the performance and flexibility of an engine with relatively slight increase in weight and size and cost of manufacture. Likewise, the engine is economical to operate with relation to the increase in power obtained.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. An apparatus of the character described, comprising a plurality of cylinders, a plurality of pistons reciprocable in said cylinders, a power shaft, a crank shaft axially offset from said power shaft, an operative connection between said crank shaft and said pistons, and means connecting said crank shaft and said power shaft to cause a differential rotation between said crank shaft and said power shaft.

2. An apparatus of the character described, comprising a plurality of cylinders, a plurality of pistons reciprocable in said cylinders, a power shaft, a crank shaft axially offset from said power shaft, an operative connection between said crank shaft and said pistons, and means connecting said crank shaft and said power shaft to cause said power shaft to rotate a greater distance than 180 degrees during a power stroke of one of said pistons.

3. An apparatus of the character described, comprising a plurality of cylinders, a plurality of pistons reciprocable in said cylinders, a power shaft, a crank shaft axially offset from said power shaft, a disc member mounted upon said power shaft, a block slidably mounted upon said disc member, and a crank arm of said crank shaft journaled in said block to cause a differential rotation between said crank shaft and said power shaft.

4. An apparatus of the character described, comprising a plurality of cylinders, a plurality of pistons reciprocable in said cylinders, a power shaft, a crank shaft axially offset from said power shaft, a disc member mounted upon said power shaft, a block slidably mounted upon said disc member, and a crank arm of said crank shaft journaled in said block to cause said power shaft to rotate a greater distance than 180 degrees during a power stroke of one of said pistons.

5. An apparatus of the character described, comprising a plurality of cylinders, a plurality of pistons reciprocable in said cylinders, a power shaft, a crank shaft axially offset from said power shaft, a disc member mounted upon said power shaft, a block slidably mounted upon said disc member, and a crank arm of said crank shaft journaled in said block to cause a differential rotation between said crank shaft and said power shaft, said disc member composed of a pair of adjustable segmental portions.

6. An apparatus of the character described, comprising a plurality of cylinders, a plurality of pistons reciprocable in said cylinders, a power shaft, a crank shaft axially offset from said power shaft, a disc member mounted upon said power shaft, a block slidably mounted upon said disc member, and a crank arm of said crank shaft journaled in said block to cause said power shaft to rotate a greater distance than 180 degrees during a power stroke of one of said pistons, said disc member composed of a pair of adjustable segmental portions.

7. An apparatus of the character described, comprising a plurality of cylinders, a plurality of pistons reciprocable in said cylinders, a power shaft journaled in a stationary bearing, a crank shaft journaled in a stationary bearing and axially offset with relation to said power shaft, an operative connection between said crank shaft and said pistons, and means connecting said crank shaft and said power shaft to cause an increased rotation of said power shaft during a power stroke of one of said pistons.

8. An apparatus of the character described, comprising a plurality of cylinders, a plurality of pistons reciprocable in said cylinders, a power shaft journaled in a stationary bearing, a crank shaft journaled in a stationary bearing and axially offset with relation to said power shaft, an operative connection between said crank shaft and said pistons, and means connecting said crank shaft and said power shaft to cause said power shaft to rotate a greater distance than 180 degrees during a power stroke of one of said pistons.

9. An apparatus of the character described, comprising a plurality of cylinders, a plurality of pistons reciprocable in said cylinders, a power shaft journaled in a stationary bearing, a crank shaft journaled in a stationary bearing and axially offset with relation to said power shaft, a disc member mounted upon said power shaft, a block slidably mounted upon said disc member, and a crank arm of said crank shaft journaled in said block to cause a differential rotation between said crank shaft and said power shaft.

10. An apparatus of the character described, comprising a plurality of cylinders, a plurality of pistons reciprocable in said cylinders, a power shaft journaled in a stationary bearing, a crank shaft journaled in a stationary bearing and axially offset with relation to said power shaft, a disc member mounted upon said power shaft, a block slidably mounted upon said disc member, and a crank arm of said crank shaft journaled in said block to cause said power shaft to rotate a greater distance than 180 degrees during a power stroke of one of said pistons.

11. An apparatus of the character described, comprising a plurality of cylinders, a plurality of pistons reciprocable in said cylinders, a power shaft journaled in a stationary bearing, a crank shaft journaled in a stationary bearing and axially offset with relation to said power shaft, a disc member mounted upon said power shaft, a block slidably mounted upon said disc member, and a crank arm of said crank shaft journaled in said block to cause a differential rotation between said crank shaft and said power shaft, said disc member composed of a pair of adjustable segmental portions.

12. An apparatus of the character described, comprising a plurality of cylinders, a plurality of pistons reciprocable in said cylinders, a power shaft journaled in a stationary bearing, a crank shaft journaled in a stationary bearing and axially offset with relation to said power shaft, a disc member mounted upon said power shaft, a block slidably mounted upon said disc member, and a crank arm of said crank shaft journaled in said block to cause said power shaft to rotate a greater distance than 180 degrees during a power stroke of one of said pistons, said disc member composed of a pair of adjustable segmental portions.

13. An apparatus of the character described, comprising a plurality of cylinders, a plurality of pistons reciprocable in said cylinders, a power shaft, a crank shaft operatively connected to certain of said cylinders, a second crank shaft operatively connected to the remainder of said cylinders, said crank shafts journaled to rotate upon the same longitudinal axis axially offset from the axis of said power shaft, means for causing a differential rotation between said crank shafts to obtain distribution of impulses, and means connecting said crank shafts and said power shaft to cause a differential rotation between said crank shafts and said power shaft.

14. An apparatus of the character described, comprising a plurality of cylinders, a plurality of pistons reciprocable in said cylinders, a power shaft, a crank shaft operatively connected to certain of said cylinders, a second crank shaft operatively connected to the remainder of said cylinders, said crank shafts journaled to rotate upon the same longitudinal axis axially offset from the axis of said power shaft, means for causing a differential rotation between said crank shafts to obtain distribution of impulses, and means connecting said crank shafts and said power shaft to cause said power shaft to rotate a greater distance than 180 degrees during a power stroke of one of said pistons.

15. An apparatus of the character described, comprising a plurality of cylinders, a plurality of pistons reciprocable in said cylinders, a power shaft, a crank shaft operatively connected to certain of said cylinders, a second crank shaft operatively connected to the remainder of said cylinders, said crank shafts journaled to rotate upon the same longitudinal axis axially offset from the axis of said power shaft, means for causing a differential rotation between said crank shafts to obtain distribution of impulses, a pair of disc members mounted upon said power shaft one for each crank shaft, a block slidably mounted upon each disc member, and a crank arm of each crank shaft journaled in the block of the associated disc member to cause said power shaft to rotate a greater distance than 180 degrees during a power stroke of one of said pistons.

16. An apparatus of the character described, comprising a plurality of cylinders, a plurality of pistons reciprocable in said cylinders, a power shaft, a crank shaft operatively connected to certain of said cylinders, a second crank shaft operatively connected to the remainder of said cylinders, said crank shafts journaled to rotate upon the same longitudinal axis axially offset from the axis of said power shaft, means for causing a differential rotation between said crank shafts to obtain distribution of impulses, a pair of disc members mounted upon said power shaft one for each crank shaft, a block slidably mounted upon each disc member, and a crank arm of each crank shaft journaled in the block of the associated disc member to cause said power shaft to rotate a greater distance than 180 degrees during a power stroke of one of said pistons, said disc member composed of a pair of adjustable segmental portions.

17. An apparatus of the character described, comprising a plurality of cylinders, a plurality of pistons reciprocable in said cylinders, a power shaft, a crank shaft operatively connected to certain of said cylinders, a second crank shaft operatively connected to the remainder of said cylinders, said crank shafts journaled to rotate upon the same longitudinal axis axially offset in a horizontal direction from the axis of said power shaft, means for causing a differential rotation between said crank shafts to obtain distribution of impulses, and means connecting said crank shafts and said power shaft to cause a differential rotation between said crank shafts and said power shaft.

18. An apparatus of the character described, comprising a plurality of cylinders, a plurality of pistons reciprocable in said cylinders, a power shaft, a crank shaft operatively connected to certain of said cylinders, a second crank shaft operatively connected to the remainder of said cylinders, said crank shafts journaled to rotate upon the same longitudinal axis axially offset in a horizontal direction from the axis of said power shaft, means for causing a differential rotation between said crank shafts to obtain distribution of impulses, and means connecting said crank shafts and said power shaft to cause said power shaft to rotate a greater distance than 180 degrees during a power stroke of one of said pistons.

In testimony whereof I have signed my name to this specification.

ROBERT CROSWELL SMITH.